United States Patent [19]

Lanzarini et al.

[11] Patent Number: 4,892,177
[45] Date of Patent: Jan. 9, 1990

[54] FRICTION CLUTCH WITH TWO FRICTION DISCS, AND A CLUTCH ASSEMBLY INCLUDING SUCH A CLUTCH

[75] Inventors: Ernesto Lanzarini, Moncalieri; Bruno Boero, Dusino S.Michele, both of Italy

[73] Assignee: Valeo, Paris, France

[21] Appl. No.: 320,234

[22] Filed: Mar. 6, 1989

[30] Foreign Application Priority Data

Mar. 9, 1988 [FR] France .................. 88 03023

[51] Int. Cl.⁴ .................. F16D 13/00; F16D 3/14; F16D 13/68; F16D 47/02
[52] U.S. Cl. .................. 192/106.2; 192/70.17; 192/106.1; 464/68
[58] Field of Search ............ 192/106 R, 106.1, 106.2, 192/70.17; 464/66, 68

[56] References Cited

U.S. PATENT DOCUMENTS

| | | | |
|---|---|---|---|
| 4,081,064 | 3/1978 | Smith et al. | 192/70.17 X |
| 4,084,674 | 4/1978 | de Gennes | 192/89 B |
| 4,663,983 | 5/1987 | Kobayashi et al. | 74/574 |
| 4,697,682 | 10/1987 | Alas et al. | 192/106.2 |
| 4,718,530 | 1/1988 | Lolzeau et al. | 192/106.2 |

FOREIGN PATENT DOCUMENTS

| | | |
|---|---|---|
| 0153078 | 8/1985 | European Pat. Off. . |
| 2073829 | 10/1971 | France . |
| 2109708 | 5/1972 | France . |
| 2139268 | 1/1973 | France . |
| 2342428 | 9/1977 | France . |
| 2162284 | 1/1986 | United Kingdom ............. 192/106.2 |

*Primary Examiner*—Dennis L. Taylor
*Assistant Examiner*—John A. Ricci
*Attorney, Agent, or Firm*—Charles E. Brown; Charles A. Brown

[57] ABSTRACT

A friction clutch comprises a first part and a second part. The first part comprises two carrier plates coupled together at a fixed axial spacing by means of spacers. The second part includes a damper plate disposed axially between the two carrier plates. The first part further includes a first friction disc and a second friction disc, of which at least the first includes a support plate which is mounted so as to be axially movable with respect to one of the carrier plates, by virtue of openings formed in the support plate with the spacers passing through these openings. A coupling device is provided, coupling the support plate to the carrier plate with respect to which it is axially movable. The support plate is disposed axially between the two carrier plates. The invention is applicable to sports cars.

6 Claims, 3 Drawing Sheets

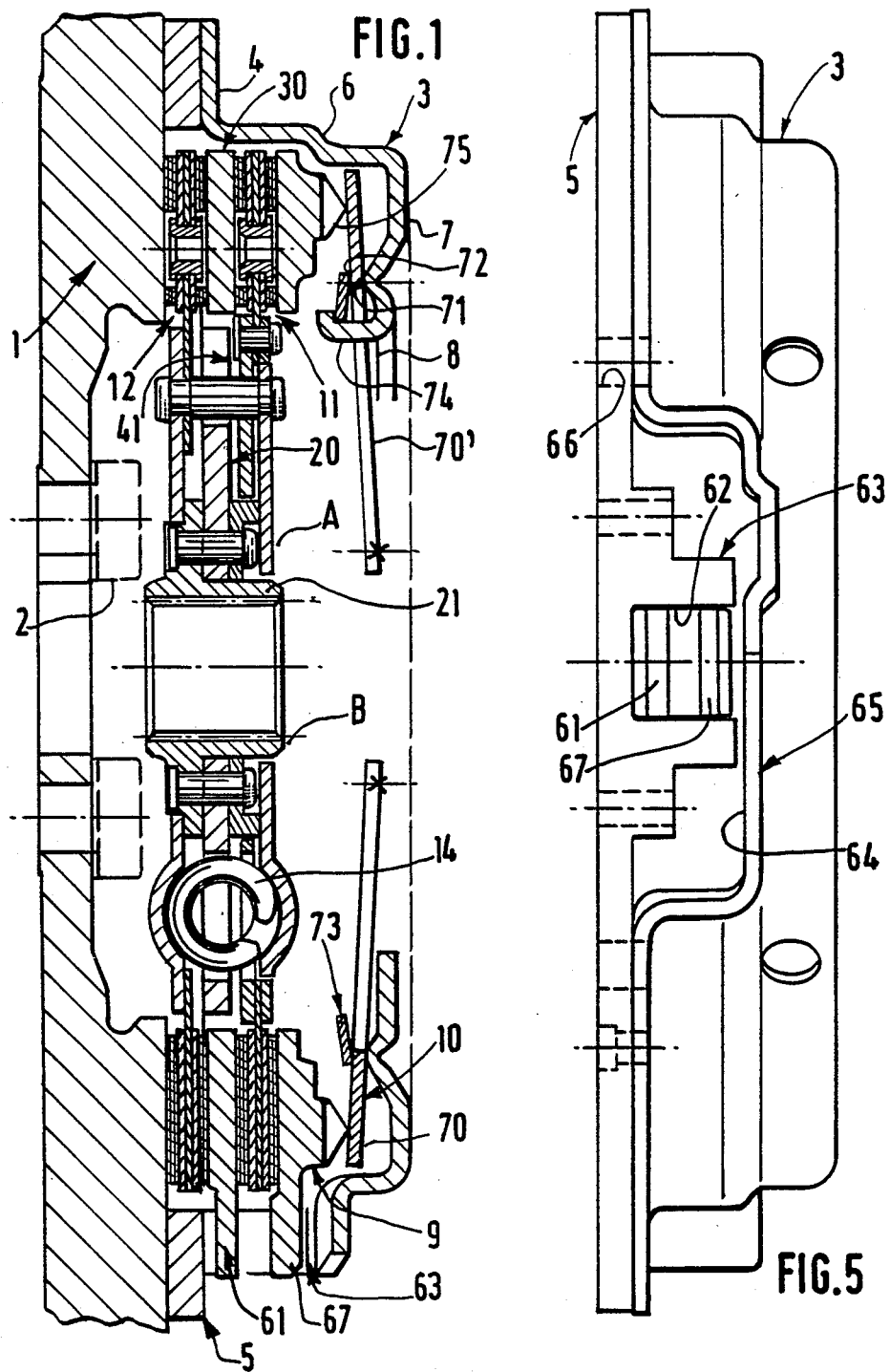

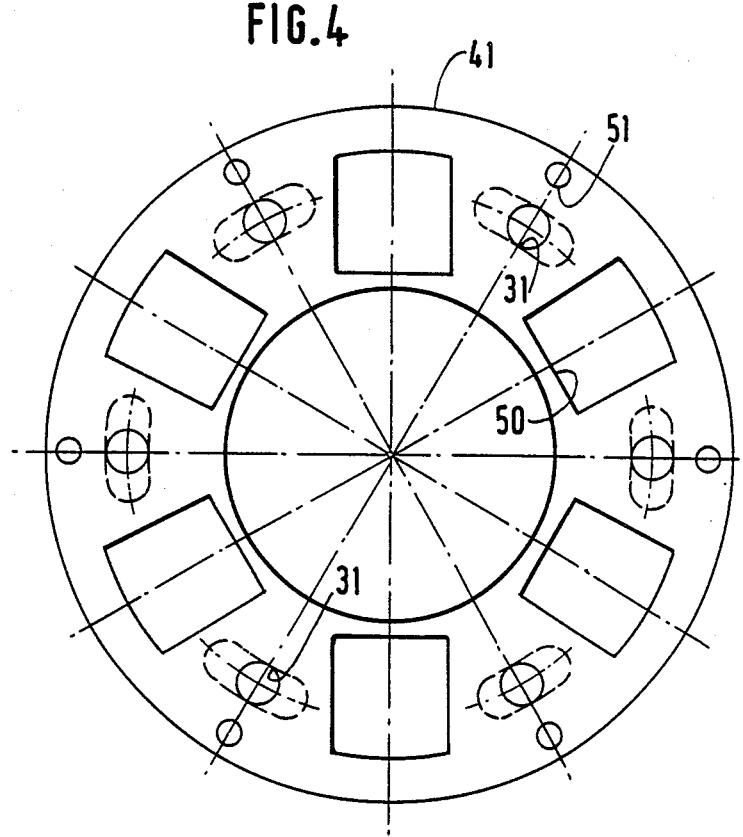
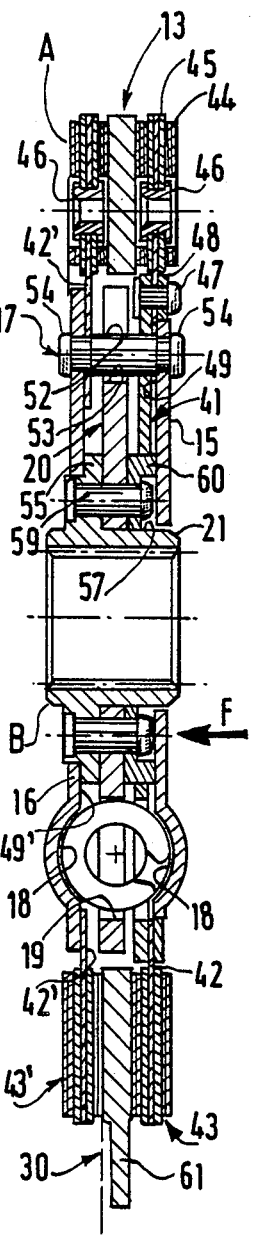
FIG.4
FIG.2

4,892,177

FRICTION CLUTCH WITH TWO FRICTION DISCS, AND A CLUTCH ASSEMBLY INCLUDING SUCH A CLUTCH

FIELD OF THE INVENTION

This invention relates to clutches of the kind having two friction discs, particularly for sports cars.

BACKGROUND OF THE INVENTION

Such a clutch, described in French published patent application FR 2 073 829A, allows the radial dimensions of the assembly, and thus its inertia, to be reduced while still permitting a large torque to be transmitted. That document describes an embodiment with two clutch plates connected together at a fixed axial spacing by means of spacers, with a damper plate disposed axially between the two clutch plates, and a friction disc which is mounted so as to be axially movable with respect to one of the clutch plates, by virtue of openings formed in the damper plate with the spacers extending through these openings, while the other disc is fixed with respect to the other clutch plate.

The clutch plates are part of a first part of the clutch, mounted rotatably with respect to a second part of the clutch with which it is coaxial. This second part includes the damper plate, and the rotational movement between the two parts takes place against the action of circumferentially acting resilient means. Coupling means are provided between the movable friction disc and the clutch plate concerned.

More precisely, the said friction disc includes a support which is movably mounted on guide and coupling pins carried by the spacers outside the zone which is delimited by the clutch plates.

Such an arrangement is relatively wasteful of space in the axial direction. It also gives rise to problems of storage and also of assembly, due to the fact that the friction disc can become detached.

SUMMARY OF THE INVENTION

An object of the present invention is to reduce the above disadvantages, by providing a friction clutch occupying less axial space and easy to handle, while also giving other advantages.

According to the invention, in a friction clutch of the kind described above, the support of the movable friction disc is disposed axially between the two clutch plates.

The axial length of a friction clutch according to the invention, reduced as mentioned above, depends on the width of the circumferentially acting resilient means. Furthermore, the friction clutch forms an assembly of components which are not liable to become detached, and lends itself to easy assembly and handling.

It is possible to take advantage of the configuration proposed by the invention to mount, in accordance with another feature of the invention, an intermediate pressure plate between the two friction discs. Such an arrangement further facilitates storage of components, and thus reduces costs.

According to a further feature of the invention, the circumferentially acting resilient means are part of the coupling means provided between the movable friction disc and the clutch plate concerned, with the said friction disc including a support plate mounted on at least part of the said resilient means.

Thus, the spacers can be made smaller, and an improved torque transmission can be obtained, with each of the friction discs being able to transmit about one half of the torque.

The description that follows illustrates the invention, by way of example, with reference to the accompanying drawings.

BRIEF DESCRIPTION OF THE DRAWINGS

FIG. 1 is a view in axial cross-section of a clutch assembly according to the invention.

FIG. 2 is a view in axial cross-section of the friction clutch itself, forming part of the assembly.

FIG. 4 is a view in elevation of the support plate of one of the clutch friction discs.

FIG. 5 is a partial side view of the clutch assembly according to the invention, with its reaction plate omitted.

DESCRIPTION OF A PREFERRED EMBODIMENT OF THE INVENTION

Figure 3:
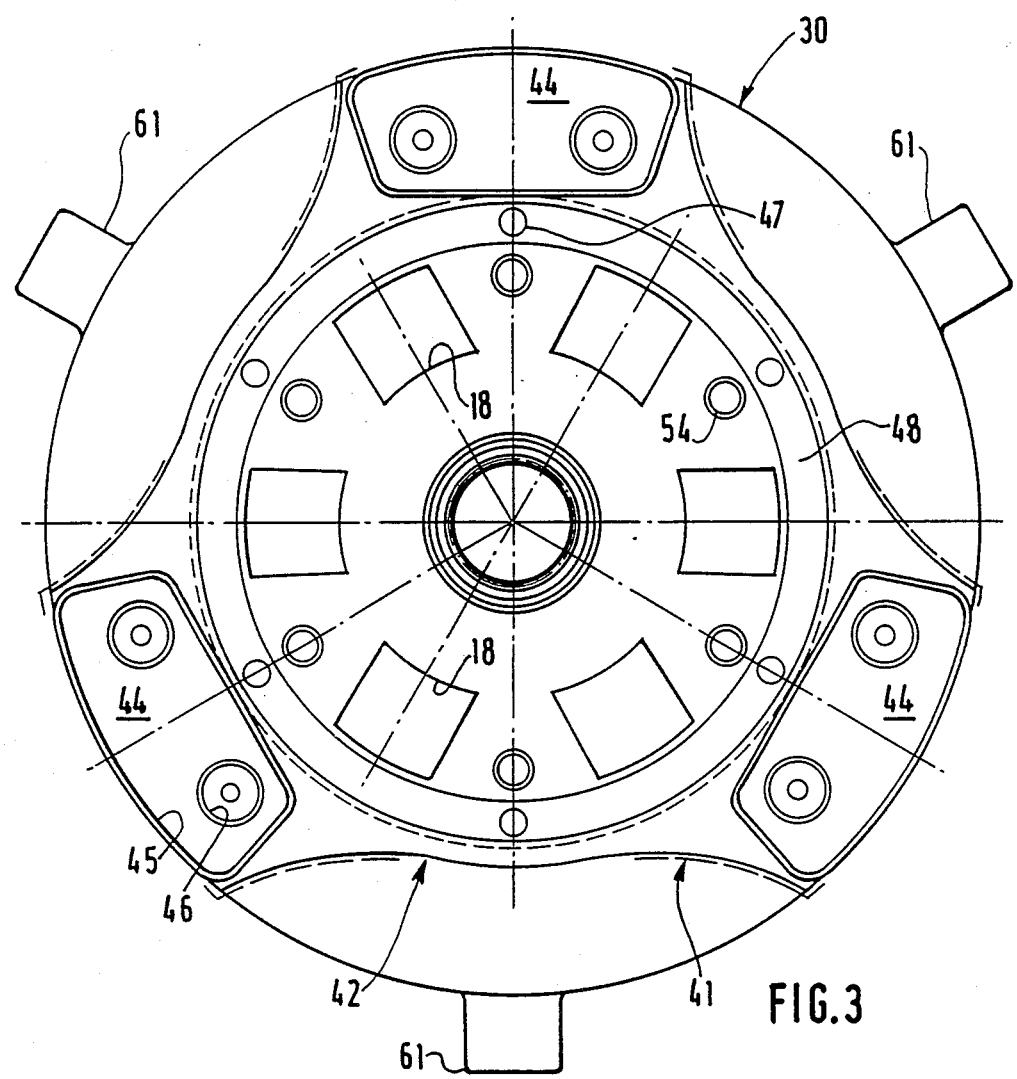
FIG. 3 is a view seen in the direction of the arrow F in FIG. 2.

FIG. 1 shows the reaction plate 1 of the clutch assembly. The reaction plate 1 is secured by means of bolts 2 (shown diagrammatically) to the output end of the crankshaft of the engine of a sports car.

A bed ring 5 is inserted axially between the reaction plate 1 and a radial securing flange 4 of a cover 3, which is secured simultaneously with the bed ring 5 to the reaction plate 1 by means of studs (not shown), the heads of which bear on the securing flange 4. The cover 3 has a generally axial skirt 6 which connects the flange 4 to a base portion 7 of the cover 3. The base portion 7 has a central opening 8.

A main pressure plate 9 is housed inside the cover 3. The pressure plate 9 is movable axially under the influence of axially acting resilient means 10, which bear on the cover 3 itself and which bias the pressure plate 9 in a direction towards the flanges 4, i.e. to the left in FIG. 1. Two friction discs 11 and 12 are thus held between the pressure plate 9 and the reaction plate 1, with, interposed between them, an intermediate pressure plate 30. The pressure plate 30 is movable axially in a manner described below.

The assembly just described includes a friction clutch 13 which is shown in both FIGS. 1 and 2. This friction clutch consists of two coaxial parts A and B, which are mounted for rotation relative to each other against the action of circumferentially acting resilient means 14. The friction discs 11 and 12 are part of the friction clutch 13.

The first part A comprises the discs 11 and 12 together with two carrier plates 15 and 16 which extend generally radially. The plates 15 and 16 are connected together, in a fixed axial spacing, by means of spacers 17. Each of the carrier plates 15 and 16 is formed with pockets 18 for accommodating the resilient means 14. In this example, the pockets 18 are formed by pressing, while the resilient means 14 are coil springs and the spacers 17 are cylindrical bars.

The springs 14 are also partly mounted within a set of openings 19, which are arranged facing the pockets 18 and which are formed in a damper plate 20 forming part of the second part B of the friction clutch. The damper plate 20 is parallel to the carrier plates 16 and is disposed axially between them. The damper plate 20 is carried by a splined hub 21.

The part A is thus adapted to be coupled with the engine, for rotation by the latter, through the friction discs 11 and 12, while the part B, through its hub 21, is here coupled with the input shaft of the gearbox for rotation with the input shaft.

The friction disc 11 (which will be called the first disc) is mounted so as to be movable axially with respect to the carrier plate 15, being provided with openings 31 (FIG. 4) through which the spacers 17 extend. The friction clutch 13 is characterised by a support plate 41, which is part of the first friction disc 11 and which is disposed axially between the carrier plates 15 and 16. In this example, the friction disc 11 includes such a support 41 in the form of a relatively thick carrier ring. The carrier ring 41 carries a support disc 42 on which friction liners 43 are mounted.

The liners 43 are discontinuous, and consist of a plurality of segments mounted facing each other on either side of the support disc 42. Each segment includes a friction material 44 carried by a metal backing piece 45, and is secured to the other segment by riveting as can be seen at 46.

The support disc 42 is secured by means of rivets 47 to the outer periphery of the support plate 41, and is inserted axially between the support plate 41 and a reinforcing ring 48. The ring 48 extends radially outwardly of the carrier plate 15, which has a smaller radius than the carrier plate 16.

The support plate 41 extends to the vicinity of the inner face 49 of the carrier plate 15 (facing towards the other carrier plate 16), with a small axial clearance between the face 49 and the support plate 41. The plate 41 has through openings 50 for accommodating the springs 14 and for mounting the plate on the latter.

The openings 31 are here in the form of through holes, arranged alternately (considered in the circumferential direction) with the openings 50, and are disposed radially inward of further openings 51 which are provided in alignment with the rivets 47 which extend through them. See FIG. 4.

In order to provide a coupling means between the support plate 41 and the carrier plate 15, the holes 31 are large enough to leave a clearance around the shanks 52 of the spacer bars 17, which also extend through slots 53 provided for this purpose in the damper plate 20, alternately with the openings 19 of the damper plate. Each spacer bar 17 has a head 54 of reduced diameter, and acts as a rivet to fasten together, respectively, the carrier plates 15 and 16, and a second support disc 42', which carries further friction liners 43' identical with the liners 43. It will be noted that the support disc 42' extends radially by a greater distance inwardly than the support disc 42, to allow the spacer heads 54 to pass through. The support disc 42' lies flat against the inner face 49' of the carrier plate 16 facing towards the other carrier plate 15.

The first support disc 42, by virtue of its support plate 41, is then axially movable with respect to the second support disc 42', with the intermediate pressure plate 30 being axially interposed between the two discs 11 and 12, or more precisely between the friction liners 43 and 43'.

The pressure plate 30 forms part of the friction clutch 13, which is easy to assemble and to adjust. In particular, the plate 30 surrounds the damper plate 20 with a clearance and can be mounted between the two friction discs 11 and 12 before the spacer bar heads 54 are deformed in the riveting operation.

The engine torque is transmitted from the friction liners 43 and 43' to the spacer bars 17, thence to the carrier plates 15 and 16, and finally to the hub 21 through the springs 14, which are here mounted without any circumferential clearance in the pockets 18 and through openings 19.

A flange 55 is formed on the hub 21, with a surface for centring of the carrier plate 16. The flange 55 also acts as a spacing ring between the carrier plate 16 and the damper plate 20. The openings for the riveting of the damper plate 20 to the hub 21 are formed in the flange 55. The damper plate is in contact with the flange 55 and is centred by the outer periphery 57 of the hub 21. For this purpose, rivets 59 are provided; they also serve to secure a bearing ring 60 having a central opening and acting as a spacer between the damper plate 20 and the carrier plate 15.

It will be understood that in this example, since the second support disc 42' and the support plate 41 are housed within the space lying between the carrier plates 15 and 16, the axial length of the friction clutch 13 depends only on the springs 14, and thus on the distance between each pocket 18 of the plate 15 and the corresponding pocket of the plate 16.

The intermediate pressure plate 30 is provided with tenons 61 for engaging in corresponding mortices 62 defined by local, axially extending projections 63 of the bed ring 5. As is best seen in FIG. 5, these projections 63 are so dimensioned that they lie within openings 64 formed in the skirt 6 of the cover 3. The openings 64 are bounded by an overhanging portion 65 of the flange 4, offset axially from the main part of the flange. A cover for securing tangential tongues to radial pads of the pressure plate conventionally has such a flange 4. In this example, there are three of these overhanging portions 65, and three corresponding projections 63. The studs which secure the cover 3 to the reaction plate 1 pass through holes 66.

This standard cover carries the resilient means 10 which act on the main pressure plate 9. In this example, this resilient means consists of a diaphragm having a peripheral portion 70 in the form of a Belleville ring, together with a central portion 70', which is in the form of a series of radial fingers with gaps between them.

The peripheral portion 70 is pivotable at its inner periphery between a primary fulcrum 71 and a secondary fulcrum 72. The primary fulcrum consists of a pressed bead formed in the base portion 7 of the cover 3. The secondary fulcrum 72 lies radially opposite the fulcrum 71, and is carried by a ring 73, which is attached to the cover 3 by means of axially extending fingers 74 extending through the diaphragm 10. The free end of each finger 74 is bent radially outwards into contact with the ring 73, in the same way as is described in French Patent No. 2 342 428.

The Belleville ring 70 bears externally on a knife edge 75, formed on the main pressure plate 9, for the purpose of biassing the latter as mentioned earlier. The action of the diaphragm 10 on the pressure plate 9, so as to free the friction discs 11 and 12 and thus disengage the clutch, ceases when the ends of the fingers 70' of the diaphragm 10 come into engagement with a declutching member, not shown.

The main pressure plate 9 is also provided with tenons 67 which are engaged in the complementary mortices 62, open axially towards the base portion 7 of the cover 3. As a result, the bed ring 5 and the pressure plates 30 and 9 are coupled together in rotation, and at the same time centred with axial mobility. The various components are assembled in axial succession. The bed ring 5, acting as a cradle for the pressure plates 30 and 9, constitutes with the pressure plates a compact subassembly on which the cover 3 with its pivoting diaphragm 10 can then be mounted.

In a preferred modification, the openings 31 formed in the support plate 41 are oblong in shape, as indicated in broken lines in FIG. 4. In this case, the torque is transmitted from the friction disc 11 to the hub 21 through the openings 50 and the springs 14, with the spacer bars 17 serving only for the purpose of centring the support plate 41.

In order to obtain good axial mobility of the friction disc 11, the springs 14 are preferably mounted with a slight circumferential clearance in the openings 50, as before. The disc 11 is then coupled to the carrier plate 15 through the springs 14. This allows the spacer bars 17 to be made smaller. It also permits the torque transmitted by the respective discs 11 and 12 to be shared substantially equally between them. In this case, the support plate 41 may be centred internally by the ring 60, and the latter may accordingly be made in an appropriate material, while the spacer bars 17 can be mounted with clearance in the holes 31 so that they have no relationship with the support plate 41.

The present invention is of course not limited to the embodiments described. For example, the spacers 17 may be in the form of flat spacer members, and the resilient means 10 may consist of coil springs controlled by pivoting levers.

Similarly, the springs 14 may be replaced by springs of elastic material; the pockets 18 may be replaced by through openings; and the friction liners 43 and 43' may be made continuous.

The springs 14 may be mounted partly with a clearance in the openings 19 and partly without clearance in the pockets 18, so that the springs 14 then have a phased action.

The openings 31 may be open, especially when the spacers 17 are, as in the case mentioned above, not in engagement with the support plate 41. In this case, the coupling means may consist of a plurality of resilient tongues, tangentially connecting, with axial mobility, the support plate 41 to the carrier plate 15.

The two friction discs 11 and 12 may be identical to each other, and may be mounted so that they are both axially movable, being disposed between the two carrier plates 15 and 16.

Finally, the springs 14 may be mounted in the through openings of the carrier plates 15 and 16, with suitable inserts being provided between each end of a spring and the corresponding lateral edge of the opening, as described in U.S. Pat. No. 4 663 983. In this case, the through openings of the support plate or plates 41 are suitably recessed to accommodate projecting trunnions of the inserts, with the latter forming part of the coupling means and facilitating sliding movement of the support plate or plates 41.

What is claimed is:

1. A friction clutch, particularly for a sports car, comprising a first part and a second part, means mounting said first and second parts for their rotation relative to each other, said means including circumferentially acting resilient means, said first part comprising a first carrier plate, a second carrier plate, and spacer means coupling the said carrier plates together at a fixed axial spacing, said second part comprising a damper plate disposed axially between the carrier plates, said first part further comprising a first friction disc and a second friction disc, said first friction disc comprising a support plate having through openings, the spacer means extending through said openings whereby the said support plate is axially movable with respect to said first carrier plate, the friction clutch further including coupling means coupling the support plate to said first carrier plate, and being characterised in that the support plate of said first friction disc is disposed axially between said first and second carrier plates.

2. A friction clutch according to claim 1, wherein the said second friction disc is disposed axially between the said carrier plates, and characterised in that an intermediate pressure plate is interposed axially between the said first and second friction discs.

3. A friction clutch according to claim 1, characterised in that the said first friction disc includes a said support plate mounted on the circumferentially acting resilient means.

4. A friction clutch according to claim 3, characterised in that the said openings in the support plate are oblong.

5. A friction clutch according to claim 4, characterised in that the spacer means extend with a clearance through the oblong openings.

6. A friction clutch according to claim 5, characterised in that the support plate is centred by means of a bearing which is fixed with respect to the damper plate of the said second part.

* * * * *